US012623806B2

(12) United States Patent
Colella et al.

(10) Patent No.: US 12,623,806 B2
(45) Date of Patent: May 12, 2026

(54) METHOD FOR APPLYING LABELS OR INK TO TARGET OBJECTS WITHOUT POST-APPLICATION CURING

(71) Applicant: Illinois Tool Works Inc., Glenview, IL (US)

(72) Inventors: Michael B. Colella, Manchester, CT (US); Carlos G. Altamirano, Manchester, CT (US); Jorge Lima, Manchester, CT (US); Luigi Filippino, Padua (IT); Lee R. B. Dixon, Cramlington (GB)

(73) Assignee: Illinois Tool Works Inc., Glenview, IL (US)

( * ) Notice: Subject to any disclaimer, the term of this patent is extended or adjusted under 35 U.S.C. 154(b) by 127 days.

(21) Appl. No.: 18/435,605

(22) Filed: Feb. 7, 2024

(65) Prior Publication Data

US 2024/0278953 A1 Aug. 22, 2024

Related U.S. Application Data

(60) Provisional application No. 63/447,502, filed on Feb. 22, 2023.

(51) Int. Cl.

| | |
|---|---|
| ***B65C 9/26*** | (2006.01) |
| ***B41M 1/12*** | (2006.01) |
| ***B41M 1/28*** | (2006.01) |
| ***B41M 1/30*** | (2006.01) |
| ***B41M 1/34*** | (2006.01) |

(Continued)

(52) U.S. Cl.
CPC ................. *B65C 9/26* (2013.01); *B41M 1/12* (2013.01); *B41M 1/28* (2013.01); *B41M 1/30* (2013.01); *B41M 1/34* (2013.01); *B41M 3/008* (2013.01); *B65C 9/46* (2013.01)

(58) Field of Classification Search
CPC . B41M 1/28; B41M 1/30; B41M 1/34; B41M 3/008; B41M 5/0058; B41M 5/0064; B41M 5/007; B65C 9/26; B65C 9/46; B44C 1/17
See application file for complete search history.

(56) References Cited

U.S. PATENT DOCUMENTS

| | | | | |
|---|---|---|---|---|
| 9,234,107 | B2 | 1/2016 | Malofsky et al. | |
| 2020/0298607 | A1 | 9/2020 | Colella et al. | |
| 2024/0278953 | A1* | 8/2024 | Colella | B65C 9/46 |

FOREIGN PATENT DOCUMENTS

| | | |
|---|---|---|
| CN | 110382247 B | 5/2022 |

OTHER PUBLICATIONS

Mimaki "UV Printer", printed on Jan. 23, 2023 https://www.mimakieurope.com/products/uv (8 pages).

(Continued)

*Primary Examiner* — Sonya M Sengupta
(74) *Attorney, Agent, or Firm* — Mary D. Lawlor; Carroll, Hoette & Butscher, LLC

(57) ABSTRACT

Methods for applying a label and may include applying a label and/or ink to form at least part of artwork, graphic, or indicia on a surface of a target object without applying a curing energy to the one or more of the label or the ink following application of the one or more of the label or the ink. Optionally, the label or ink is applied without heating or exposing the label or ink to ultraviolet light following application of the label or ink.

17 Claims, 3 Drawing Sheets

(51) Int. Cl.
*B41M 3/00* (2006.01)
*B65C 9/46* (2006.01)

(56) References Cited

OTHER PUBLICATIONS

Search Report mailed Jul. 23, 2024 for corresponding European Patent Application No. 24158474.7 (7 pages).

* cited by examiner

METHOD FOR APPLYING LABELS OR INK TO TARGET OBJECTS WITHOUT POST-APPLICATION CURING

CROSS-REFERENCE TO RELATED APPLICATIONS

This application claims priority to U.S. Provisional Application No. 63/447,502 (filed 22 Feb. 2023), the entire disclosure of which is incorporated herein by reference.

BACKGROUND

Technical Field

The subject matter described herein relates to applying labels or ink to surfaces of target objects, such as applying heat transfer labels or ink to metal surfaces. Not all embodiments of the subject matter described herein is limited to applying heat transfer labels or ink to metal surfaces, as other labels or surfaces may be used.

Discussion of Art

Some target objects have surfaces on which heat transfer labels or inks are applied to identify the target objects, identify the manufacturer or retailer of the target objects, provide warnings, etc. For example, many appliances have metal surfaces on which heat transfer labels or screen-printed inks are applied to indicate trade names or trademarks of the manufacturers or retailers of the appliances.

Some currently known processes for applying these labels or inks involve applying the labels or inks to the surfaces of target objects, and then applying a curing energy to the labels or inks, and the surfaces of the target objects. This can cure the labels or inks to strengthen adhesion between (a) the labels or inks and (b) the surfaces of the target objects and/or to improve the durability of the labels or inks. This curing energy is typically thermal energy (e.g., heat) that is applied by heating, or baking, the portion of the target object having the applied label or inks. Optionally, the curing energy may be applied by directing light energy (e.g., ultraviolet, or UV, light) toward the labels or inks.

Applying this curing energy involves an additional step in the label or ink application process and can require additional hardware in a facility. This can increase the required space, cost, complexity, and time to apply the labels or inks to the target objects.

Another approach is to apply an adhesive or other material to the surface of the label that will be adhered to the target object. But applying this adhesive adds to the cost and complexity of applying the labels, the adhesive can create a halo effect when viewing the label, etc.

A need may exist for a less expensive, less complex, and/or less time-consuming process or method for applying labels or inks to target objects using potentially less space than some known processes.

BRIEF DESCRIPTION

In one example, a method for applying a label and may include applying one or more of a label or ink to form at least a first part or entirety of artwork, graphic, or indicia on a surface of a target object without applying a curing energy to the one or more of the label or the ink following application of the one or more of the label or the ink.

In another example, another method for applying a label may include applying one or more of a label or ink to form at least a first part or an entirety of artwork, graphic, or indicia on a surface of a target object without heating the one or more of the label or the ink or exposing the one or more of the label or the ink to ultraviolet light following application of the one or more of the label or the ink.

In another example, another method for applying a label may include applying one or more of a label or ink to form a first subpart of artwork, graphic, or indicia on a surface of a target object without curing the one or more of the label or the ink in the first subpart following application of the one or more of the label or the ink to form the first subpart. The method also may include applying an additional portion of the one or more of the label or the ink to form a second subpart of the artwork, the graphic, or the indicia on the surface of the target object without curing the one or more of the label or the ink in the second subpart following application of the one or more of the label or the ink to form the second subpart.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
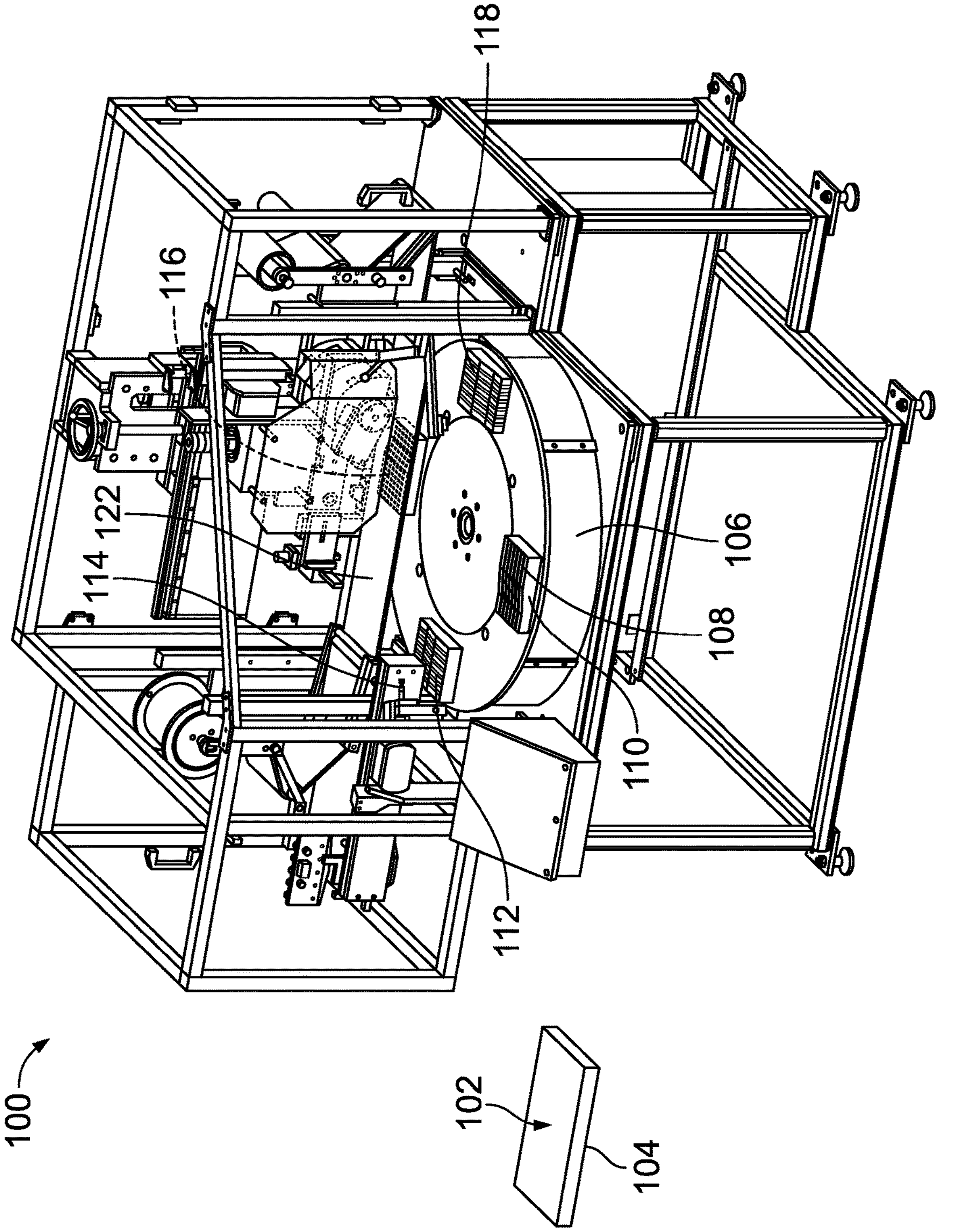
FIG. 1 illustrates one example of an application system that may be used to apply labels and/or inks onto a surface of a target object without post-application curing.

One or more embodiments of the inventive subject matter described herein provide processes and systems for applying labels and/or inks to surfaces of target objects without a post-application curing operation or step. For example, the labels or inks may be applied in such a way to cure the labels or inks during the application process such that the labels or inks are instantly cured or cured as the labels or inks are placed into contact with the surfaces of the target object, without applying a curing energy after the labels or inks have been applied to the surfaces of the target objects. Additionally, each label or ink may be a single layer of material. No adhesive or other material may be added to the label or the ink to adhere the label or ink to the target object. Instead, the label or ink itself, without any additional adhesive and/or protective lacquer, may be bound to the target object without applying any surplus or additional curing energy.

The inks may be applied to the target object surfaces using a variety of processes, including direct screen printing. This can involve applying the ink directly onto the surface via a screen. The labels may be applied to the target object surfaces via heat transfer. This can involve pre-printing the desired graphic, artwork, and/or other indicia onto a carrier film to form the label and using a combination of heat and pressure to apply the label transfer (and then peel away the carrier film). This leaves the artwork, graphic, and/or other indicia adhered to the surface of the target object (e.g., without applying any additional adhesive).

The inks and labels may be applied such that the inks and labels are cured while the inks and labels are being applied to the surfaces such that no curing energy is directed toward the inks or labels after the inks or labels are applied to the surfaces of the target objects. For example, the labels or inks may not be intentionally heated to temperatures associated with increased cross-linking of polymers of the labels or inks after the labels or inks are applied (e.g., placed onto) the target object surfaces. As another example, the labels or inks may not be intentionally exposed to UV light directed or focused on the labels or inks, where the UV light is associated with increased cross-linking of polymers of the labels or inks after the labels or inks are applied (e.g., placed onto) the target object surfaces.

In one embodiment, the inks or labels described herein may include polymers and one or more cross-linking agents. The activation temperature of the cross-linking agents may be no warmer than the temperature at which the labels or inks are applied to the surfaces of the target objects. For example, the activation temperature of the cross-linkers may be the same as or cooler than an application temperature at which the inks, labels, and/or target object surfaces are at while the labels or inks are laid, printed, or placed into engaging contact with the target object surfaces. The cross-linkers may be activated at temperatures that are no warmer than, or that are cooler than, the application temperature through use of catalysts and/or longer dwell times. For example, the chemical reaction that occurs to cross-link the inks or labels may occur at cooler temperatures by applying pressure to the inks or labels for longer time periods (e.g., longer dwell times) and/or adding one or more chemical compounds or products (i.e., catalysts) to the inks or labels. Stated differently, at the application temperature that is no warmer than or is cooler than the activation temperature of the cross-linking agents, the cross-linking agents may cross-link the inks or labels responsive to the dwell time being increased and/or catalysts being added to the inks or labels. For the avoidance of doubt, the application of heat above the application temperature is not a catalyst in at least one embodiment of the subject matter described herein.

The latent cross-linking agents may link polymer chains with each other, which can increase adhesion of the labels or inks to the substrate (e.g., the target object surface). This also can increase the resistance against physical or chemical agents without the use of a supplemental protective lacquer. This also can improve the durability of the labels or inks. The adhesion and/or durability may be increased or improved relative to inks or labels that do not include the cross-linking agents. No adhesive or additional layer or partial layer of material is added to the side or surface of the labels or inks that will be coupled with the target objects in one example. Instead, the materials forming the labels or inks themselves may bind to the target objects without any adhesive between (a) the labels or inks and (b) the target objects.

FIG. 1 illustrates one example of an application system 100 that may be used to apply labels and/or inks onto a surface 102 of a target object 104 without post-application curing or usage of any adhesives. Stated differently, the application system can apply the labels and/or inks without heating and/or directing UV light toward the labels or inks to cure the labels or inks (or the adhesion or bond between the surface and the labels/inks) after completion of applying the labels or inks, and without any adhesive being present between the target object and the labels or inks. The application system shown in FIG. 1 is but one example of different types of systems that may be used to apply the inks or labels without a post-application curing step.

Figure 2:
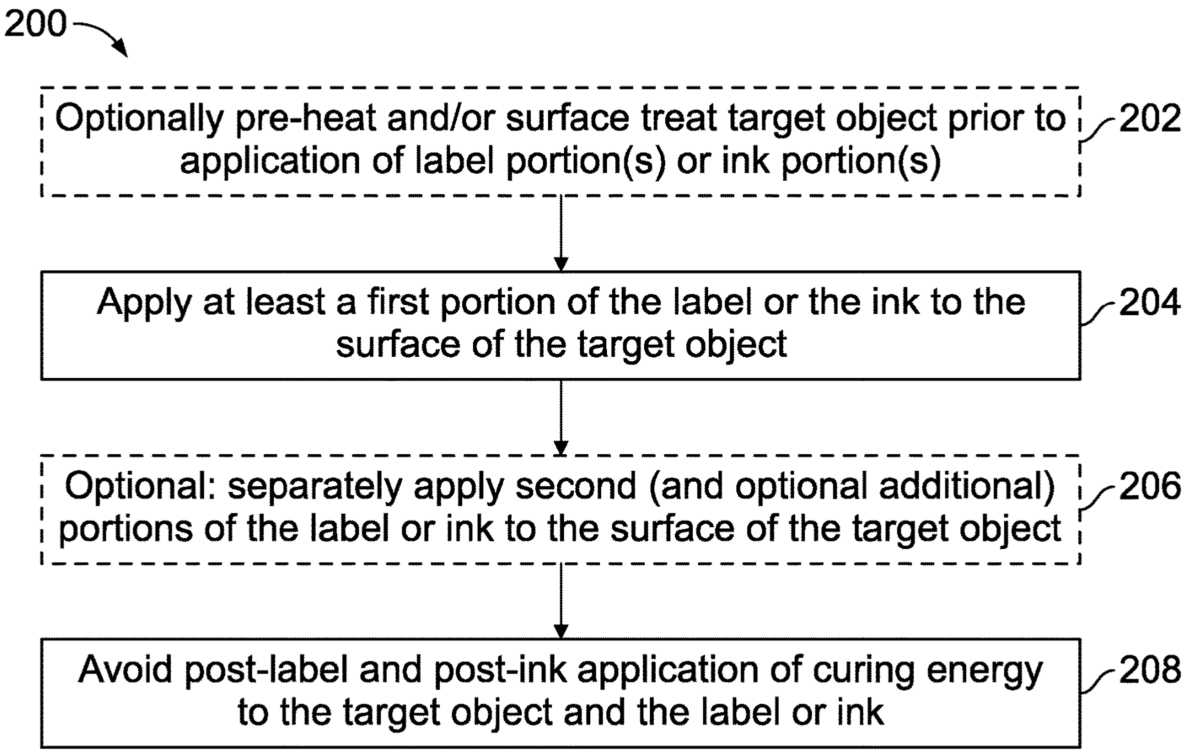
FIG. 2 illustrates a flowchart of one example of a method for applying a label or ink(s) to a target object surface without a post-application curing step or operation.

With continued reference to the application system shown in FIG. 1, FIG. 2 illustrates a flowchart of one example of a method 200 for applying a label or ink(s) to a target object surface without a post-application curing step or operation. The method will be described in connection with the description of the application system, although another, different application system may be used to perform the operations, steps, or actions of the method.

The application system includes a work table 106 that provides a surface on which the target object may be disposed during application of the label or ink to the surface of the target object (e.g., the application step or operation). The work table optionally can be referred to as a work surface, a work bench, a table, a bench, a platform, a body having the work surface, etc. In the illustrated example, the work table is round and is rotatable about or around a center axis of the round shape of the work table. Alternatively, the table may be a different shape, move in another manner (e.g., along one or more linear paths, one or more curved but non-circular paths, a combination of linear and curved paths, etc.), or the like. One or more motors or other devices can move (e.g., rotate) the work table to move the target objects between different stations of the work table. The work table may be automatically and/or manually moved (e.g., rotated).

The work table may include several platforms 108 on which target objects may be located during application of the labels or inks by the application system. The platforms may represent locations or areas on the work table where the target objects may be placed or can represent components that hold and/or support the target objects. A loading/unloading station 110 of the application system represents a space or volume where different target objects can be positioned on the platforms. The application system may be large enough (and/or the target objects small enough) be loaded with multiple target objects on a platform to apply labels or inks to multiple target objects at the same time. Alternatively, the application system may be loaded with only a single target object to apply labels or inks to a single target object (for each station) at a time.

One or more target objects can placed onto a platform while the platform is in the loading/unloading station of the application system. The target object surfaces on which the labels or inks are applied by the application system may be metal in one embodiment. These metal surfaces may be metal without any other layers on the surface, a coated metal surface, a painted metal surface, or the like. For example, the target objects may be doors, panels, or the like, of appliances (e.g., refrigerators, clothes washers or dryers, dish washers, ovens, microwaves, etc.) or other devices that are not appliances and on which the labels or inks are applied. In another example, the target object surfaces may be another type of material, such as a dielectric material (e.g., glass or plastic), a fabric, wood, or the like.

The work table may then move (e.g., rotate) so that the platform having the recently loaded target object(s) are within a pre-treatment station 112 of the application system. The pre-treatment station represents a space or volume in which the surface of the target object is modified prior to applying the label or ink(s). For example, the application system may include a pre-treatment or heating device 114 in the pre-treatment station. This heating device can generate thermal energy to heat the surface of the target object on which the label or ink(s) will be applied. For example, the heating device can be a flame generator or torch that generates flames toward the target object surface. As another example, the heating device can be a resistive heating element that generates heat toward the target object surface. Optionally, the pre-treatment device 114 can change the target object surface by including a blown-ion plasma treater, an electron beam source, a corona treater, or another source of electric energy that directs energy toward the target object surface.

Returning to the description of the method illustrated in FIG. 2, at 202, the target object surface optionally is pre-heated or otherwise treated (e.g., changed) prior to application of the label or ink(s). For example, the target object surface may be pre-heated prior to application of any part of the label or ink(s). This pre-heating may improve adhesion of the label or ink(s) (relative to not heating the target object surface). Pre-heating the target object surface also may reduce or eliminate a difference in temperatures between the target object surface and components that apply the labels or inks (e.g., heat transfer rollers, screen printers, or the like, as described herein). This can prevent the target object from cooling the component(s) of the components that apply the label or ink(s), which could negatively impact application of the label or inks. Pre-heating the target object surface also may clean the target object surface to remove contaminants (e.g., oil, grease, etc.) before application of the label or ink(s), thereby also improving adhesion and transfer (e.g., relative to not pre-heating the target object surface). In another example, the heating device can include or be another pre-treatment device, such as a device that applies air, chemicals, water, etc. to clean the target object surface or otherwise surface treat or prepare the target object surface for receipt of the label or ink(s). Alternatively, the application system does not include the pre-treatment station, the heating device, and/or another pre-treatment device. The method optionally may not include the pre-heating operation or step of 202.

Although not shown in FIG. 2, the work table can move (e.g., rotate) until the platform with the target object (that just left the pre-treatment station, if included in the application system or that just left the loading station, if the pre-treatment station is not included in the application system) is at a first or upstream application station 116. The application system also may include a second or downstream application station 118, and optionally can include one or more additional application stations. Each of the application stations can represent a space or volume in which part or an entirety of a label or inks are applied to the surface of the target object.

In one embodiment, the label or inks(s) may be applied to the target object surface in different parts. For example, each application station of the application system may apply part of the label or part of the ink(s) to the target object surface such that each application station applies part, but less than all, of the entire graphic, artwork, or other indicia that is to be applied to the target object surface by the application system during one trip or batch of the target object through the stations of the application system. In the method shown in FIG. 2, at 204, a first part of the label or ink(s) forming the graphic, artwork, and/or indicia to be applied to the target object surface is applied. An applicator device 120 can apply the label, ink(s), or part of the label or ink(s) to the target object surface in each application station. Only one applicator device is shown in one applicator station in FIG. 1 to enable more of the application system to be visible, but each of the application stations can include an applicator device.

Each applicator device in each application station can apply one half (or a different fraction) of the total label or ink to be applied to the target object surface by the application system. Alternatively, the applicator device can apply all the total label or ink to be applied to the target object surface by the application system. The applicator device(s) can represent heat transfer systems that include heat presses or rollers that apply both heat and pressure to a carrier film 122 holding a heat transfer label (or a part thereof) to transfer the label to the target object surface. As another example, the applicator device(s) can represent printers, such as screen printers, that apply the ink(s) to form the artwork, graphics, indicia, or a portion thereof, to the target object surface. As another example, the applicator device(s) can represent another type of printer, such as an ink jet printer, a pad printing device, or the like. The applicator device(s) optionally can include a heating element (e.g., a resistive heater or another type of heater) that heats the label, ink(s), and/or target object surface in the application station.

Applying the label or ink(s) in separate batches or portions, instead of applying the label or ink(s) at one time and without intentional interruption, can improve adhesion and/or durability of the labels and ink(s) applied to the target object surface. For example, reducing the size of the label or amount of ink(s) applied to the target object surface by an applicator device can reduce the size of the interface between the surface and the label/ink, which also can reduce or eliminate air from being trapped between the label or ink, and the target object surface. Reducing or eliminating such trapped air can increase the size of the interface between the surface and the label/ink for that portion that is applied (relative to air being trapped between the surface and the label/ink), thereby increasing adhesion and the durability of the label or ink. Alternatively, the application system may include only a single applicator device, or each applicator device may apply an entirety of the label or ink(s) forming the graphic, artwork, or other indicia to be applied onto the surface of the target object.

If the label or ink(s) are applied in different parts or batches, then the method shown in FIG. 2 can proceed from 204 toward 206 where an additional portion of the label or ink(s) forming the graphic, artwork, or indica is applied. This operation at 206 can repeat one or more times to apply different portions of the label or ink(s) until the entirely of the label or ink(s) forming the graphic, artwork, or indicia is applied to the target object surface. Optionally, if the label or ink(s) are to be applied at one time (and not in separate parts or portions), then the method may not include 206. At 208, application of the label or ink(s) is completed, but without any curing step, operation, or action following completion of deposition of the label or ink(s) onto the target object surface.

The label or ink(s) may be cured as the label or ink(s) are applied to the target object surface. For example, the cross-linking agents in the formulations of the label (e.g., the inks forming the label on the carrier film) may cross-link polymer chains in the label or ink(s) as the label or ink(s) are being deposited onto the target object surface, and not after application and only upon receipt of curing energy. This cross-linking may occur during the process, step, or action of stamping or printing the label or ink(s) onto the target object surface due to the temperature of the label, ink(s), and/or target object surface being hot enough to initiate cross-linking of the polymer chains of the label or ink(s). For example, prior to the temperature of the cross-linking agent in the inks reaching or exceeding a cross-linking threshold temperature, the cross-linking agents may remain coupled with the polymer chains forming the cross-linking agents. Once the temperature of the cross-linking agent reaches or exceeds the threshold temperature, the cross-linking agents may cross-link the polymer chains in the label or ink(s).

As a result, the label or ink(s) are deposited on the target object surface with polymer chains in the label or ink(s) being cross-linked. This can reduce or eliminate the need for further curing of the label or ink(s) as the polymer chains in the label or ink(s) are already cross-linked. No additional curing energy such as heat or UV light may be directed to the label or ink(s) on the surface of the target object. The need for equipment, time, and energy for a post-application curing step of the label or ink(s) is eliminated, thereby reducing required space, cost, and complexity of applying the label or ink(s) to the target object surface.

In one embodiment, the surface of the work table on which the target objects are located may be heated to a temperature that is above the ambient temperature. Optionally, the applicator device may be heated to a temperature that is above the ambient temperature.

As described above, the label or ink(s) may optionally be deposited in separate parts. Each part of the total label or ink(s) that is deposited at one time may be cured or instantly cured during deposition of the label or ink(s), as previously set forth. The heat (or other curing energy) used to deposit and cure the next portion of the label or ink(s) may be isolated from the previously deposited (and cured) portion(s) of the label or ink(s) such that no further curing of a previously applied label or ink portion occurs during subsequent application of another label or ink portion. This isolation can be due to the distance between the different portions being sufficiently far to allow the heat to dissipate before causing additional curing of the previously applied portion or to prevent the UV light from reaching (and additional curing of) the previously applied portion.

After application of the entire label or ink(s), the work table can automatically move or be manually moved such that the completed target object is back in the loading/unloading station. The target object may then be removed from the application system from the loading/unloading station. Alternatively, there may be separate stations for loading and unloading the target objects. Multiple target objects may move through the application system at the same time. For example, each platform can include another target object, with a different part of the process for applying the label or ink(s) being performed on different target objects on different platforms at the same time or during overlapping or common time periods. This application system may eliminate the post-application curing stage (and associated equipment), but also may consolidate the application and pre-treatment steps into a single automated machine. This can significantly reduce application cycle time (e.g., from thirty seconds per target object to ten to twelve seconds per target object).

In contrast to using the work table that automatically or manually rotates through the different stations, the stations may be connected by one or more tracks, conveyors, or the like, that are not arranged in a circle. Instead, the stations and tracks may be disposed in an oval or racetrack shape, a U-shape, a linear shape, or another shape that is not a circle and that does not involve the work table rotating between the different stations. This can avoid bottlenecks or delays at one station slowing up or stopping movement of the target objects through the system. For example, with the rotating work table, a slowdown or bottleneck at one station may prevent all other target objects being processed in different stations of the same work table from proceeding. In contrast, a non-rotating system (e.g., a track or conveyor moving target objects through different stations) can allow for the target objects ahead of a slowdown at a station to automatically or manually proceed with further processing and operations at downstream stations, and may permit target objects behind the slowdown at the station to proceed with further processing at upstream stations (until the target objects reach the slowdown station). Optionally, one or more robotic systems or devices may pick up and move the target objects at or between the stations.

While one or more embodiments described herein do not use a post-application curing step of the label or ink(s), at least one embodiment may include the post-application curing step. For example, one or more of the target objects may be processed using a post-application bake or curing step whereby the target objects are heated. This may be used for some substrates or target object surfaces, such as glass substrates, graphite substrates, and the like. Examples of other substrates that may be used (with or without the post-application curing step) may include metal (e.g., stainless steel, chrome steel, etc.), composites (e.g., that include graphite), polymers (e.g., polyoxymethylene), etc. As another example, a post flame treat head or device may heat the label or inks after the label or inks have been applied to the target object surface within an automated transport of the target object to the unloading station. For example, an automatic pad printing system may flame treat the target object surface before and/or after the pad prints ink onto the target object surface.

Figure 3:
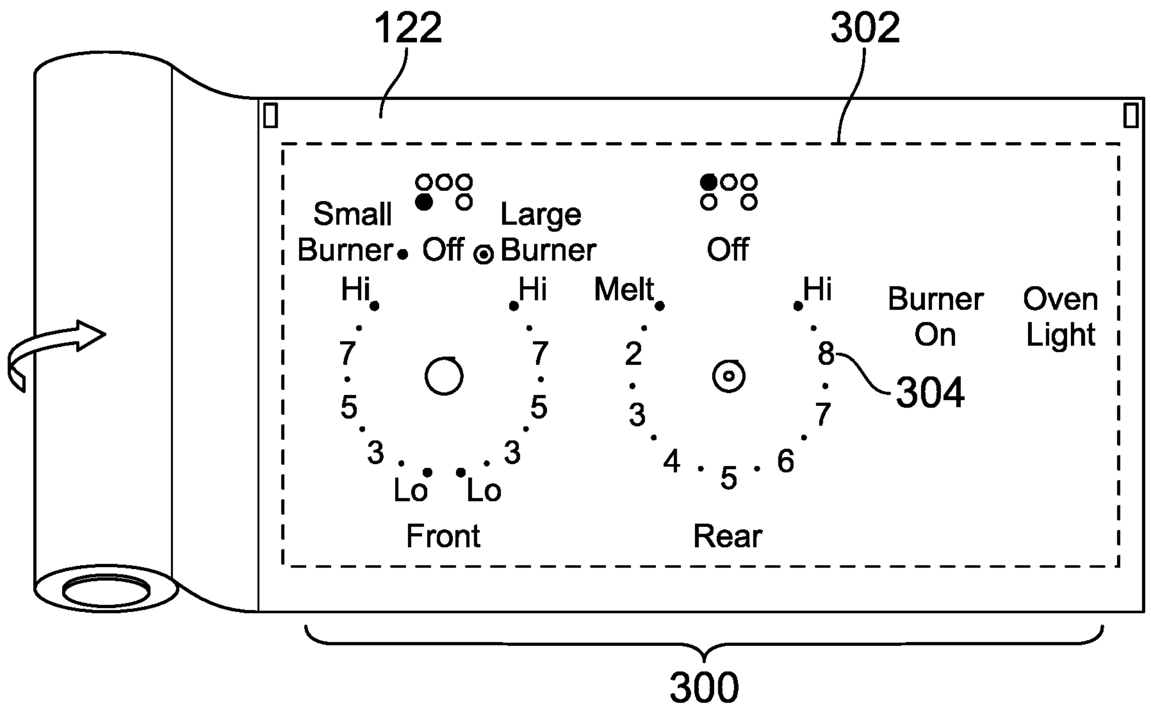
FIG. 3 illustrates a first portion or part of one example of a label 302 that may be applied to the target object surface.
Figure 4:
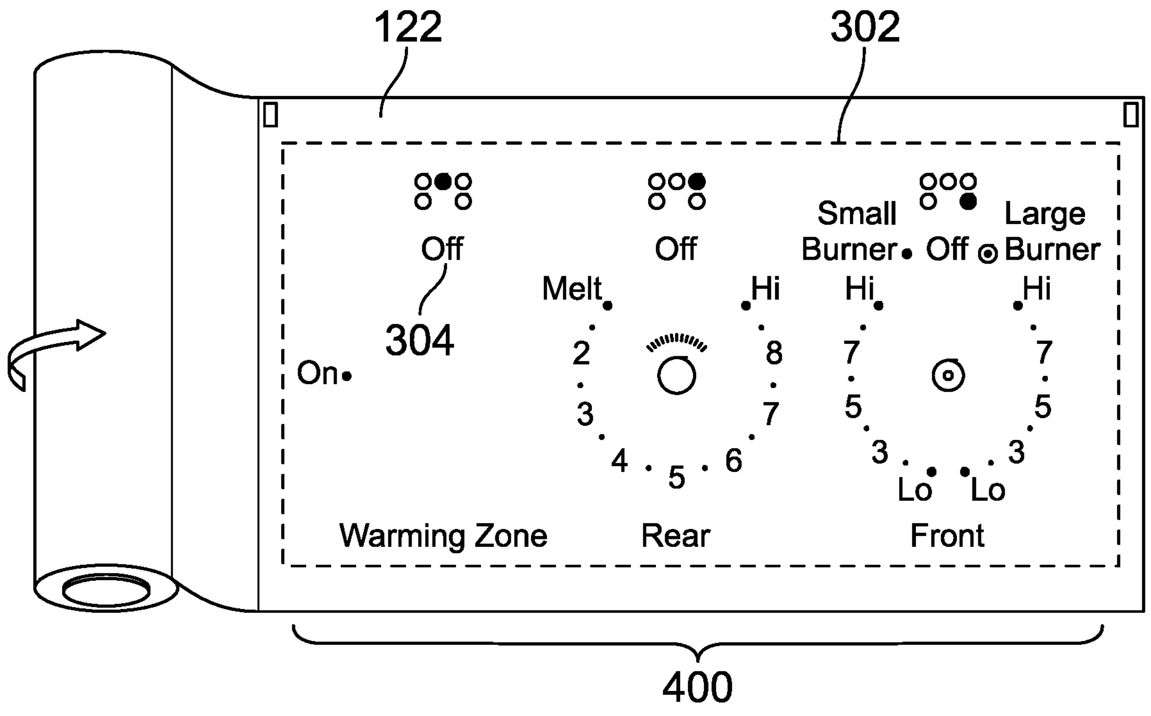
FIG. 4 illustrates a different, second portion or part of one example of the label that may be applied to the target object surface.

FIGS. 3 and 4 illustrate different portions or parts 300, 400 of one example of a label 302 that may be applied to the target object surface. The label may be formed from a combination of these portions or parts. In the illustrated example, the label parts form different portions of markers 304 for an oven door. Alternatively, the label parts may form different portions of other markers, indicia, graphics, or the like. As described above, the part of the label shown in FIG. 4 may be first applied and cured onto the target object surface prior to application of the second part of the label shown in FIG. 4.

In one example, a method for applying a label and may include applying one or more of a label or ink to form at least a first part or entirety of artwork, graphic, or indicia on a surface of a target object without applying a curing energy to the one or more of the label or the ink following application of the one or more of the label or the ink.

The one or more of the label or the ink may be applied by applying only the first part of the artwork, the graphic, or the indicia. The method also may include applying one or more of an additional portion of the label or an additional portion of the ink to form at least a second part of the artwork, the graphic, or the indicia on the surface of the target object. The first part and the second part of the artwork, the graphic, or the indicia may be applied to the surface of the target object without applying the curing energy to the one or more of the label or the ink between or after applying either the first part or the second part.

The one or more of the label or the ink may include one or more cross-linking agents and catalysts that initiate, propagate, or terminate cross-linking of the one or more of the label or the ink during application of the one or more of the label or the ink. The one or more of the label or the ink may be applied without heating the one or more of the label or the ink following application of the one or more of the label or the ink.

The one or more of the label or the ink may cure (entirely or partially) during application of the one or more of the label or the ink without additional heating of the one or more of the label or the ink. The one or more of the label or the ink may be applied to a metal surface as the surface of the target object.

Optionally, the method also may include heating the surface of the target object prior to application of the one or more of the label or the ink to the surface of the target object.

In another example, another method for applying a label may include applying one or more of a label or ink to form at least a first part or an entirety of artwork, graphic, or indicia on a surface of a target object without heating the one or more of the label or the ink or exposing the one or more of the label or the ink to ultraviolet light following application of the one or more of the label or the ink.

Applying the one or more of the label or the ink may include applying only the first part of the artwork, the graphic, or the indicia, and the method also may include applying one or more of an additional portion of the label or an additional portion of the ink to form at least a second part of the artwork, the graphic, or the indicia on the surface of the target object. The first part and the second part of the artwork, the graphic, or the indicia may be applied to the surface of the target object without curing the one or more of the label or the ink between or after applying either the first part or the second part.

The one or more of the label or the ink may include one or more cross-linking agents and catalysts that initiate cross-linking of the one or more of the label or the ink during application of the one or more of the label or the ink. The one or more of the label or the ink may be applied to a metal surface, coated metal surface, or painted metal surface as the surface of the target object.

The method also may include heating the surface of the target object prior to application of the one or more of the label or the ink to the surface of the target object.

In another example, another method for applying a label may include applying one or more of a label or ink to form a first subpart of artwork, graphic, or indicia on a surface of a target object without curing the one or more of the label or the ink in the first subpart following application of the one or more of the label or the ink to form the first subpart. The method also may include applying an additional portion of the one or more of the label or the ink to form a second subpart of the artwork, the graphic, or the indicia on the surface of the target object without curing the one or more of the label or the ink in the second subpart following application of the one or more of the label or the ink to form the second subpart.

The one or more of the label or the ink may include one or more cross-linking agents and catalysts that initiate cross-linking of the one or more of the label or the ink during application of the one or more of the label or the ink in the first part and during application of the one or more of the label or the link in the second part. The one or more of the label or the ink may be applied without heating the one or more of the label or the ink or exposing the one or more of the label or the ink to curing ultraviolet light following application of the one or more of the label or the ink in the first part or the second part. The one or more of the label or the ink may be applied to a metal, coated metal, or painted metal surface as the surface of the target object.

The method also may include heating the surface of the target object prior to application of the one or more of the label or the ink to the surface of the target object to form the first part of the graphic, the artwork, or the indicia. The surface of the target object may be formed from plastic or glass.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:

applying one or more of a label or ink to form at least a first part or entirety of artwork, graphic, or indicia on a surface of a target object without applying a curing energy to the one or more of the label or the ink following application of the one or more of the label or the ink and without any adhesive being between (a) the one or more of the label or the ink and (b) the surface of the target object, wherein the one or more of the label or the ink includes one or more cross-linking agents and catalysts that initiate, propagate, or terminate cross-linking of the one or more of the label or the ink during application of the one or more of the label or the ink.

2. The method of claim 1, wherein applying the one or more of the label or the ink includes applying only the first part of the artwork, the graphic, or the indicia, and further comprising:

applying one or more of an additional portion of the label or an additional portion of the ink to form at least a second part of the artwork, the graphic, or the indicia on the surface of the target object.

3. The method of claim 2, wherein the first part and the second part of the artwork, the graphic, or the indicia are applied to the surface of the target object without applying the curing energy to the one or more of the label or the ink between or after applying either the first part or the second part.

4. The method of claim 1, wherein the one or more of the label or the ink is applied without heating the one or more of the label or the ink following application of the one or more of the label or the ink.

5. The method of claim 1, wherein the one or more of the label or the ink cures during application of the one or more of the label or the ink without additional heating of the one or more of the label or the ink.

6. The method of claim 1, wherein the one or more of the label or the ink is applied to a metal surface as the surface of the target object.

7. The method of claim 1, further comprising heating the surface of the target object prior to application of the one or more of the label or the ink to the surface of the target object.

8. A method comprising:

applying one or more of a label or ink to form at least a first part or an entirety of artwork, graphic, or indicia on a surface of a target object without heating the one or more of the label or the ink or exposing the one or more of the label or the ink to ultraviolet light following application of the one or more of the label or the ink, wherein the one or more of the label or the ink includes one or more cross-linking agents and catalysts that initiate cross-linking of the one or more of the label or the ink during application of the one or more of the label or the ink.

9. The method of claim 8, wherein applying the one or more of the label or the ink includes applying only the first part of the artwork, the graphic, or the indicia, and further comprising:

applying one or more of an additional portion of the label or an additional portion of the ink to form at least a second part of the artwork, the graphic, or the indicia on the surface of the target object.

10. The method of claim 9, wherein the first part and the second part of the artwork, the graphic, or the indicia are applied to the surface of the target object without curing the one or more of the label or the ink between or after applying either the first part or the second part.

11. The method of claim 8, wherein the one or more of the label or the ink is applied to a metal surface, coated metal surface, or painted metal surface as the surface of the target object.

12. The method of claim 8, further comprising heating the surface of the target object prior to application of the one or more of the label or the ink to the surface of the target object.

13. A method comprising:

applying one or more of a label or ink to form a first subpart of artwork, graphic, or indicia on a surface of a target object without curing the one or more of the label or the ink in the first subpart following application of the one or more of the label or the ink to form the first subpart; and applying an additional portion of the one or more of the label or the ink to form a second subpart of the artwork, the graphic, or the indicia on the surface of the target object without curing the one or more of the label or the ink in the second subpart following application of the one or more of the label or the ink to form the second subpart, wherein the one or more of the label or the ink includes one or more cross-linking agents and catalysts that initiate cross-linking of the one or more of the label or the ink during application of the one or more of the label or the ink in the first part and during application of the one or more of the label or the link in the second part.

14. The method of claim 13, wherein the one or more of the label or the ink is applied without heating the one or more of the label or the ink or exposing the one or more of the label or the ink to curing ultraviolet light following application of the one or more of the label or the ink in the first part or the second part.

15. The method of claim 13, wherein the one or more of the label or the ink is applied to a metal, coated metal, or painted metal surface as the surface of the target object.

16. The method of claim 13, further comprising heating the surface of the target object prior to application of the one or more of the label or the ink to the surface of the target object to form the first part of the graphic, the artwork, or the indicia.

17. The method of claim 13, wherein the surface of the target object is formed from plastic or glass.

* * * * *